US006996376B2

(12) United States Patent
Clifton (10) Patent No.: US 6,996,376 B2
(45) Date of Patent: Feb. 7, 2006

(54) ANTENNA SWITCH (75) Inventor: John Christopher Clifton, Hook (GB)

(73) Assignee: Sony United Kingdom Limited, Weybridge (GB)

( * ) Notice: Subject to any disclaimer, the term of this patent is extended or adjusted under 35 U.S.C. 154(b) by 340 days.

(21) Appl. No.: 10/163,916

(22) Filed: Jun. 6, 2002

(65) Prior Publication Data

US 2003/0001787 A1    Jan. 2, 2003

(30) Foreign Application Priority Data

Jun. 8, 2001    (GB) .................................... 0114045

(51) Int. Cl.
*H04B 1/44* (2006.01)
*H03F 1/14* (2006.01)
*H01P 5/12* (2006.01)

(52) U.S. Cl. ...................... 455/78; 455/127.3; 455/83; 330/51; 333/101; 333/103

(58) Field of Classification Search ................ 455/78, 455/82–84, 553.1, 572, 127.1–127.4, 103, 455/107, 114.4, 129; 343/702, 876; 333/101, 333/103, 124, 132; 330/51; 327/403, 404, 327/405
See application file for complete search history.

(56) References Cited

U.S. PATENT DOCUMENTS

| | | | | |
|---|---|---|---|---|
| 5,126,688 A | * | 6/1992 | Nakanishi et al. ........... 330/285 |
| 5,459,428 A | * | 10/1995 | Kim et al. ................... 327/387 |
| 5,477,184 A | * | 12/1995 | Uda et al. .................... 327/404 |
| 5,548,239 A | * | 8/1996 | Kohama ....................... 327/408 |
| 5,548,246 A | * | 8/1996 | Yamamoto et al. ........... 330/51 |
| 5,669,068 A | * | 9/1997 | Kielmeyer et al. ........... 455/83 |
| 5,678,199 A | | 10/1997 | Birth et al. ................... 455/80 |
| 5,745,009 A | * | 4/1998 | Leroux et al. ............... 330/277 |
| 5,784,687 A | * | 7/1998 | Itoh et al. ..................... 455/78 |
| 6,078,797 A | * | 6/2000 | Kashimura ............... 455/234.1 |
| 6,081,694 A | * | 6/2000 | Matsuura et al. ............. 455/78 |
| 6,118,338 A | * | 9/2000 | Frank et al. ................... 330/51 |
| 6,122,488 A | * | 9/2000 | Leizerovich et al. .......... 455/78 |
| 6,804,500 B2 | * | 10/2004 | Yamaguchi ............... 455/127.1 |

FOREIGN PATENT DOCUMENTS

| | | |
|---|---|---|
| EP | 1 124 334 | 8/2001 |
| EP | 1 124 337 | 8/2001 |
| GB | 2 335 116 | 9/1999 |
| JP | 08-251089 | * 9/1996 |
| WO | WO 02 080393 | 10/2002 |

OTHER PUBLICATIONS

Patent Abstract of Japan, JP 09 008779, Jan. 10, 1997.

* cited by examiner

*Primary Examiner*—Duc M. Nguyen
(74) *Attorney, Agent, or Firm*—Frommer Lawrence & Haug LLP; William S. Frommer; Thomas F. Presson (57) ABSTRACT

An antenna switch including a transmit connection for inputting a radio frequency signal, an antenna connection for connection to an antenna for transmitting the radio frequency signal, and a signal path between transmit connection and the antenna connection including at least one transmit transistor controllable to connect selectively the transmit connection to the antenna connection so as to transfer the radio frequency signal from the transmit connection to the antenna connection wherein the transmit transistor is arranged so as to provide a stage of amplification to the radio frequency signal.

15 Claims, 5 Drawing Sheets

ANTENNA SWITCH

BACKGROUND OF THE INVENTION

1. Field of the Invention

The present invention relates to an antenna switch and a method of providing a radio frequency signal to an antenna switch.

2. Description of the Related Art

In transceivers, such as mobile telephones, it is known to provide an antenna switch for switching between the transmit and receive path to the antenna. Indeed, multi-band and/or multi-mode devices are known having two or more transmit paths and/or two or more receive paths. Antenna switches may be provided to switch between these parts.

Each transmit path requires a power amplifier to amplify a radio frequency signal to a high enough level for it to reach a receiver, such as a base-station. For multi-mode and multi-band devices, separate power amplifiers may be needed for each mode or band.

Figure 1:
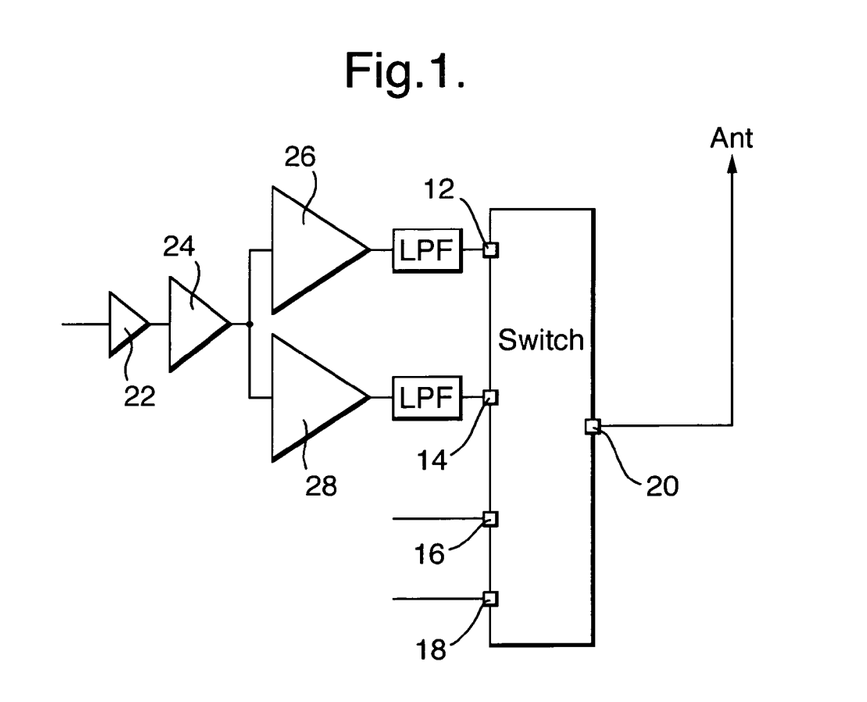
FIG. 1 illustrates a known arrangement for a dual band power amplifier and antenna switch.

FIG. 1 of the accompanying drawings illustrates schematically an example of an arrangement of power amplifiers and a switch for a dual band transceiver. The switch 10 includes transmit connections 12 and 14 for inputting respectively GSM 900 and GSM 1800 radio frequency signals. It also includes received connections 16 and 18 for outputting GSM 900 and GSM 1800 radio frequency signals, together with an antenna connection 20 for connection to an antenna.

The illustrated power amplifier for the transmit (TX) paths has three stages, though two or four stages could be used depending on the application. As illustrated, the first stage 22 and second stage 24 can be provided in common for both transmit paths. However, it is usually necessary, as illustrated, to provide separate third stage amplifiers 26, 28 for the respective transmit paths. It will be appreciated also that each subsequent stage of amplification requires greater die area than the previous stage. The areas required for the final stage of amplification are significantly great and, hence, add to the size and cost of producing the arrangement of FIG. 1 for multi-band and/or multi-mode devices.

OBJECTS OF THE INVENTION

It is an object of the present invention to provide amplification and switching of a radio frequency signal which at least reduces the problems discussed above and in which the area required for amplification can be reduced, particularly with regard to multi-band and/or multi-mode devices.

SUMMARY OF THE INVENTION

According to the present invention, there is provided a method of providing a radio frequency signal to an antenna. The method includes selectively connecting the radio frequency signal to the antenna with an antenna switch including at least one transistor and amplifying the radio frequency signal by arranging the at least one transistor of the antenna switch to provide amplification of the radio frequency signal.

This may be achieved by providing the radio frequency signal to the gate of the at least one transistor so as to amplify the radio frequency signal and selectively providing a DC bias to the gate of the at least one transistor so as to turn the transistor on or off.

According to the present invention, there is also provided an antenna switch including a transmit connection for inputting a radio frequency signal, an antenna connection for connection to an antenna for transmitting the radio frequency signal and a signal path between the transmit connection and the antenna connection including at least one transmit transistor controllable to connect selectively the transmit connection to the antenna connection so as to transfer the radio frequency signal from the transmit connection to the antenna connection. The transmit transistor is arranged so as to provide a stage of amplification to the radio frequency signal.

In this way, any transistors already required by the antenna switch to selectively connect transmit paths to the antenna can be used to provide the final stage of amplification. This results in a die area which is considerably less than the sum of the previously used separate power amplifier and switch, thereby also providing a significant cost reduction. Furthermore, this architecture allows the overall efficiency of the transmit chain to increase. Thus, for a mobile telephone handset, an improved talk-time can be given from a given battery capacity.

It will also be appreciated that, by reducing the overall area in this way, it becomes possible to provide multi-band and multi-mode operations more easily at reduced cost. In this respect, it will be appreciated that the power amplification for each transmit path can be provided in the same way as defined above, i.e. by the transistor(s) of the respective paths in the switch.

This arrangement results in a separate third or final output stage of the power amplifier being eliminated. Since, in the previous architecture, the antenna switch adds insertion loss to the transmit path, the new architecture reduces losses and thus improves efficiency. This is because the transmit switch function also performs the function of the power amplifier output stage.

Another benefit is that the power amplifier output impedance level is higher, thus allowing far greater ease of multi-band and multi-mode operation due to the lower Q-factor and larger frequency bandwidths over which they can be matched, for instance to 50 ohms.

Preferably, the signal path includes a plurality of series connected transmit transistors, the transmit transistors together providing the stage of amplification.

It is normal to provide, for each signal path, a plurality of series connected transistors, i.e. connected drain to source, to connect or disconnect that path from the antenna.

It need not be necessary to use any additional transistors for each signal path, such that no additional area is required by the transistors. However, each series connected plurality of transistors may be connected to the rest of the circuit in a novel manner so as to achieve the required amplification.

The antenna switch may of course include a plurality of signal paths with one or more transistor in each path for selectively connecting the respective path to the antenna connection.

Preferably, the transmit connection is connected to the gate of the or each transmit transistor such that the radio frequency signal is transferred from the transmit connection to the gate of the or each transmit transistor.

In this way, each transistor (where there is more than one) in the signal path from a transmit connection amplifies the radio frequency signal supplied to that transmit connection. A suitable bias is provided at the drain, gate and source of the or each transistor such that it provides the required amplification.

Preferably, a gate DC bias circuit is connected to the gate of the or each transmit transistor so as to enable the respective transmit transistor to be turned on or off according to a DC gate bias.

Thus, for each signal path, the transistor(s) can be turned on or off so as to provide the antenna switch functionality as well as the amplification.

Preferably, the drain/source conduction path of the transmit transistor or transistors is connected between a DC bias connection and ground such that the transmit transistor or transistors can be turned on or off according to a DC drain/source bias.

Thus, by means of the DC bias connection, a DC bias may be selectively applied such that the drain/source conduction path of each transistor has an appropriate bias voltage to cause the required amplification. By removing the DC bias, the transistors may be turned off and amplification prevented.

In general, whether or not a transistor is turned on or off will depend on the drain/source voltage. Thus, the transistors may be turned on or off by varying appropriately the DC bias applied across respective sources and drains. In particular, this is preferably achieved by varying the relative values of the gate bias voltages applied by the gate bias circuit and the drain/source bias voltage applied by the bias connection.

Preferably, the signal path includes an inductor/capacitor resonant circuit connected between the transistor or transistors and the antenna connection so as to eliminate one or more frequencies. An L/C parallel trap may be provided so as to eliminate a particular frequency or a series resonant pass may be provided so as to pass only the frequency of the respective signal path.

This is particularly useful when another signal path in the antenna switch is used for a higher frequency radio frequency signal, for instance a harmonic in the case of GSM 900 and GSM 1800. In particular, it would not be possible to eliminate these higher frequencies using a low pass filter at the antenna due to the need for transmitting similar frequencies from the other signal path. Thus, a parallel resonant 1800 MHz trap may be used to eliminate the 1800 MHz harmonic of the GSM900 signal path, or a series resonant 900 MHz pass may be used to pass only the 900 MHz signal.

Preferably, a matching circuit is provided between the signal path and the antenna connection to provide impedance matching.

It will be appreciated that standard amplification stages include impedance matching, for instance to 50 ohms in the case of mobile telephone technology, to match them to down stream components. Since it is proposed to use the antenna switch transistors for amplification as well as switching, a suitable matching circuit is proposed for the output of the transistors.

As suggested above, the antenna switch may include at least one additional signal path, for instance starting with a transmit connection. In this case, the matching circuit preferably provides impedance matching at at least two frequencies corresponding to the frequencies intended for the respective transmit connections and signal paths.

Hence, when the antenna switch includes multiple transmit paths for different respective bands, the antenna switch should be matched to the antenna for all of those bands.

Preferably, the signal path includes at least one amplification stage between the transmit connection and the at least one transmit transistor.

Since the final and largest stage of amplification has been incorporated into the antenna switch, preferably for each transmit path, it becomes possible to integrate the earlier and smaller stages of amplification in the same arrangement.

The antenna switch may be embodied as an MMIC (Monolithic Microwave Integrated Circuit).

Thus, all of the amplification and switching circuits may be implemented in one single integrated circuit.

According to the present invention, there is preferably provided a transceiver and a mobile telephone unit including an antenna switch as defined above.

DETAILED DESCRIPTION OF THE PREFERRED EMBODIMENTS

The invention will be more clearly understood from the following description, given by way of example only, with reference to the accompanying drawing.

The present invention is particularly applicable to power amplifier and antenna switch architectures for multi-band and/or multi-mode transceivers such as mobile telephone handsets. Within the GSM mode, four bands exist, namely GSM 900 (also known merely as GSM), GSM 1800 (also known as DCS), GSM 1900 (also known as PCS) and GSM 850. Furthermore, there are additional modes such as EDGE and the third generation WCDMA standard.

In order to provide a handset capable of transmitting or receiving in different bands or modes, it is necessary to provide an antenna switch.

Figure 2:
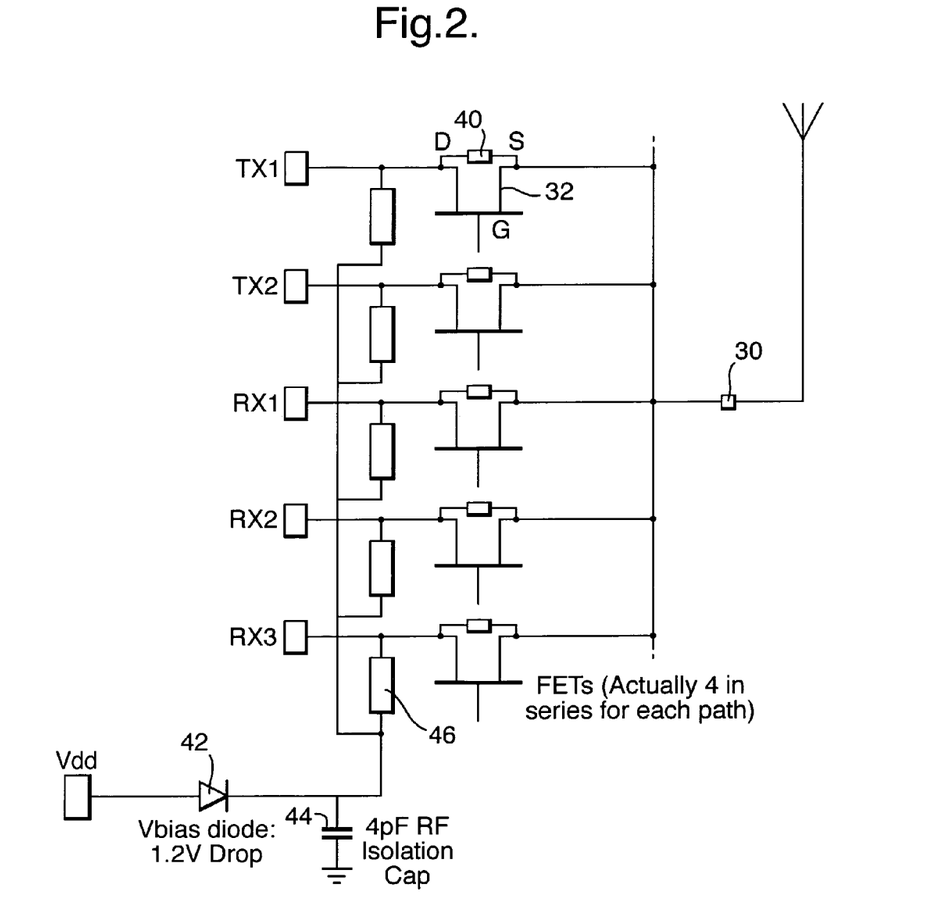
FIG. 2 illustrates schematically a known triple band antenna switch.

FIG. 2 illustrates a known triple band antenna switch arrangement. A plurality of transmit connections TX1, TX2 and receive connections RX1, RX2, RX3 are connected to an antenna connection 30 via respective signal paths. Although illustrated for simplicity with a single transistor 32 in each path, four series transistors, such as JFETs, may actually be provided in series for each path, with the source of one transistor connected to the drain of the adjacent transistor. A resistor 40 bridges the drain and source of each transistor and a bias voltage is provided to the drains and sources of the transistors from a supply voltage Vdd via a diode 42, a radio frequency isolation capacitor 44 and respective resistors 46. By virtue of the diode 42, the drains and sources of the transistors are biassed to a voltage below the supply voltage Vdd, for instance at Vdd minus 1.2V.

By selectively applying the supply voltage Vdd to the respective gates of the transistors, they may be turned on so as to allow transfer of a radio frequency signal between the antenna connection 30 and a respective transmit or receive connection.

As will be appreciated, and as illustrated in FIG. 1, power amplifiers are required to amplify radio frequency signals from the transmit path to a high enough level in order to reach a base-station. For instance, for GSM 900, maximum output levels of 33 dBm (2 watts) is required and, for GSM 1800, maximum output levels of 30 dBm (1 watt) is required.

Typically, separate power amplifiers are required for each mode or band though, as illustrated in FIG. 1, initial stages of power amplification may be shared in some cases.

The present invention proposes a new architecture which combines the separate power amplifiers and switch components into one circuit, preferably a MMIC (Monolithic Microwave Integrated Circuit) based on GaAs (Gallium Arsenide).

Figure 3:
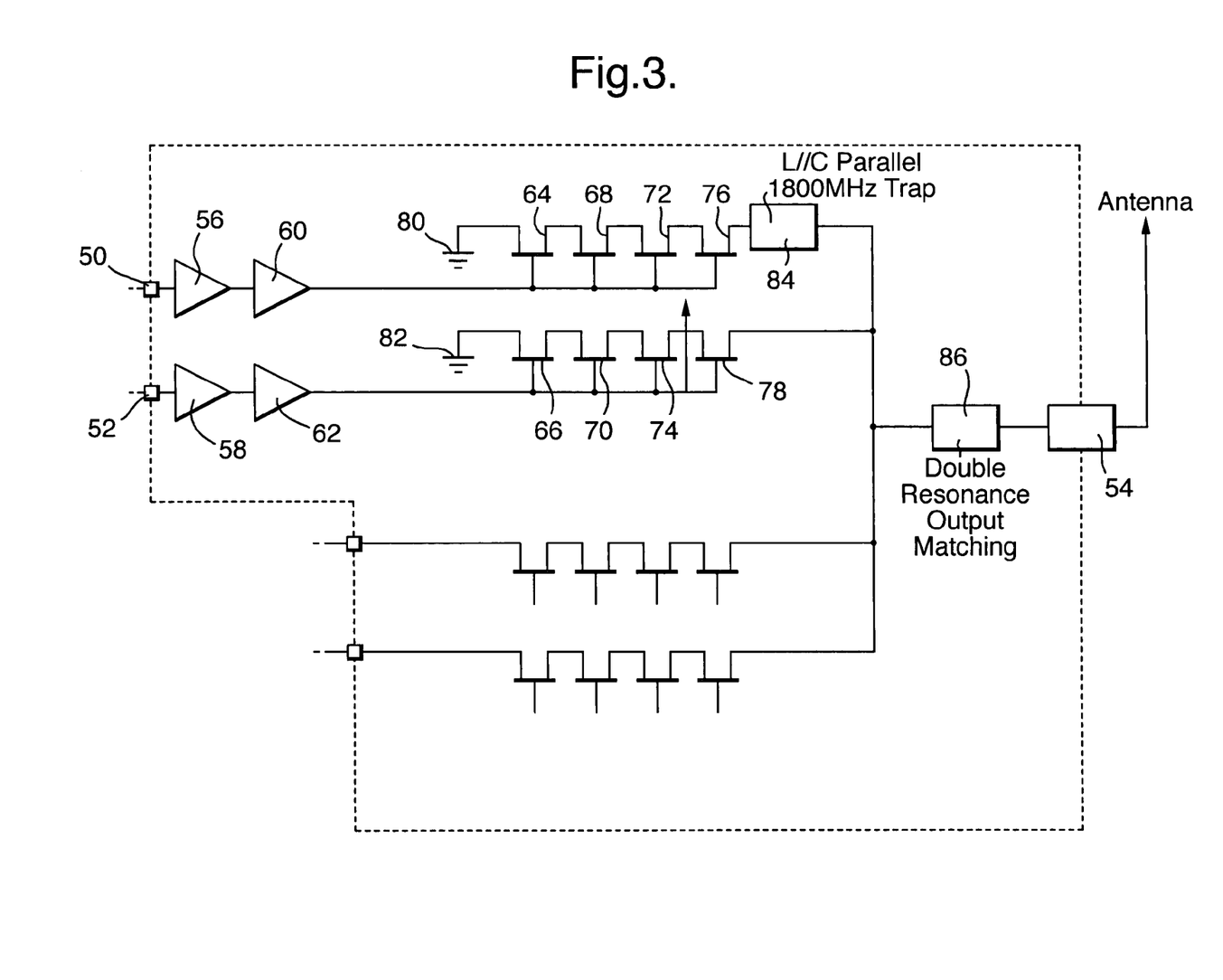
FIG. 3 illustrates schematically the radio frequency circuit of an antenna switch embodying the invention.

FIG. 3 illustrates the radio frequency paths for a preferred embodiment of the present invention. The particular illustrated embodiment is a dual band device. However, it should be appreciated that additional signal paths can be introduced for additional bands or modes. Similarly, the present invention could also be used in a single band and single mode device and/or a transmitter with no receive paths.

As illustrated, transmit connections 50 and 52 are provided. These each provide respective radio frequency signals to signal paths which lead to an antenna connection 54.

Each signal path first includes two stages of amplification 56, 58 and 60, 62. These stages of amplification may be of any suitable design and include matched outputs of preferably 50 ohms.

As with previous antenna switches, each signal path then includes a plurality of transistors 64–78, such as JFETs, connected in series, i.e. with the source of one connected to the drain of the next.

However, unlike the previous antenna switch, the radio frequency signal of each respective signal path is provided to the gates of the respective transistors 64, 68, 72, 76 and 66, 70, 74, 78. The drain of the first transistor 64, 66 of each series is, in contrast, connected to ground 80, 82. By applying a suitable bias voltage to the drains and sources of the transistors, as well as to the gates, it is possible to provide them in a state suitable for amplifying the radio frequency signal provided to their gates. In this way, the transistors 64–78 are used for the output stage of the power amplifier.

This arrangement results in a separate third or final output stage of the power amplifier being eliminated. Since, in the previous architecture, the antenna switch adds insertion loss to the transmit path, the new architecture reduces losses and thus improves efficiency. This is because the transmit switch function also performs the function of the power amplifier output stage.

Another benefit is that the power amplifier output impedance level is higher, thus allowing far greater ease of multi-band and multi-mode operation due to the lower Q-factor and larger frequency bandwidths over which they can be matched, for instance to 50 ohms.

In the illustrated embodiment, transmit connection 50 is intended for GSM 900 at 900 MHz and transmit connection 52 is intended for GSM 1800 at 1800 MHz. However, it will be appreciated that the signal paths from the transmit connection 50 and transmit connection 52 respectively could additionally be used for GSM 850 and GSM 1900. Thus, the arrangement of FIG. 3 could be adapted to be tri band or four band by adding appropriate receive signal paths. Of course, other embodiments, might include additional paths.

Amplification of the 900 MHz signal with transistors 64,68,72 and 76 will result in the generation of harmonics. Since the first of these will be at 1800 MHz, i.e. the frequency of the signal provided to transmit connection 52, the illustrated embodiment includes a filter 84 for removing these components. In particular, this may be a parallel inductor/capacitor 1800 MHz trap, though a 900 MHz pass could alternatively be used.

Since the transistors 64 to 78 are now operating as amplifiers, their outputs will be relatively low impedance and will need matching to the antenna. Hence, an impedance matching circuit 86 is provided for connecting the respective signal paths to the antenna connector 54. Since a signal matching circuit 86 is provided in common for the signal paths, including the receive signal paths, it is provided to match the impedance for each of the respective bands. Thus, in the illustrated embodiment, a double resonant output matching circuit is provided.

Finally, it may be noted that the receive signal paths are of a known construction since it is not necessary to provide any radio frequency amplification.

Figure 4:
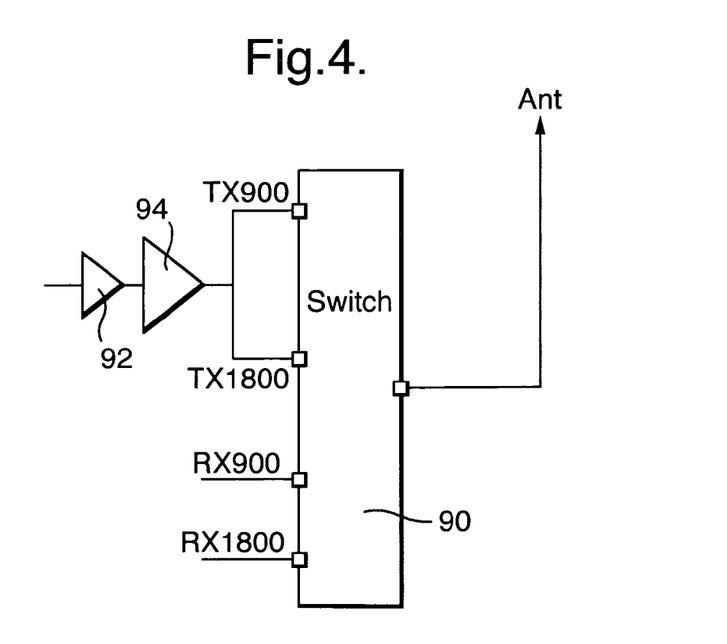
FIG. 4 illustrates schematically a dual band antenna switch according to the present invention incorporating a final stage of amplification.

FIG. 4 illustrates a dual band arrangement similar to that of FIG. 1, but in which the separate power amplifiers 26 and 28 have been incorporated into a switch 90. However, the smaller shared power amplifiers 92 and 94 on this embodiment are provided separately to the switch 90.

Figure 5:
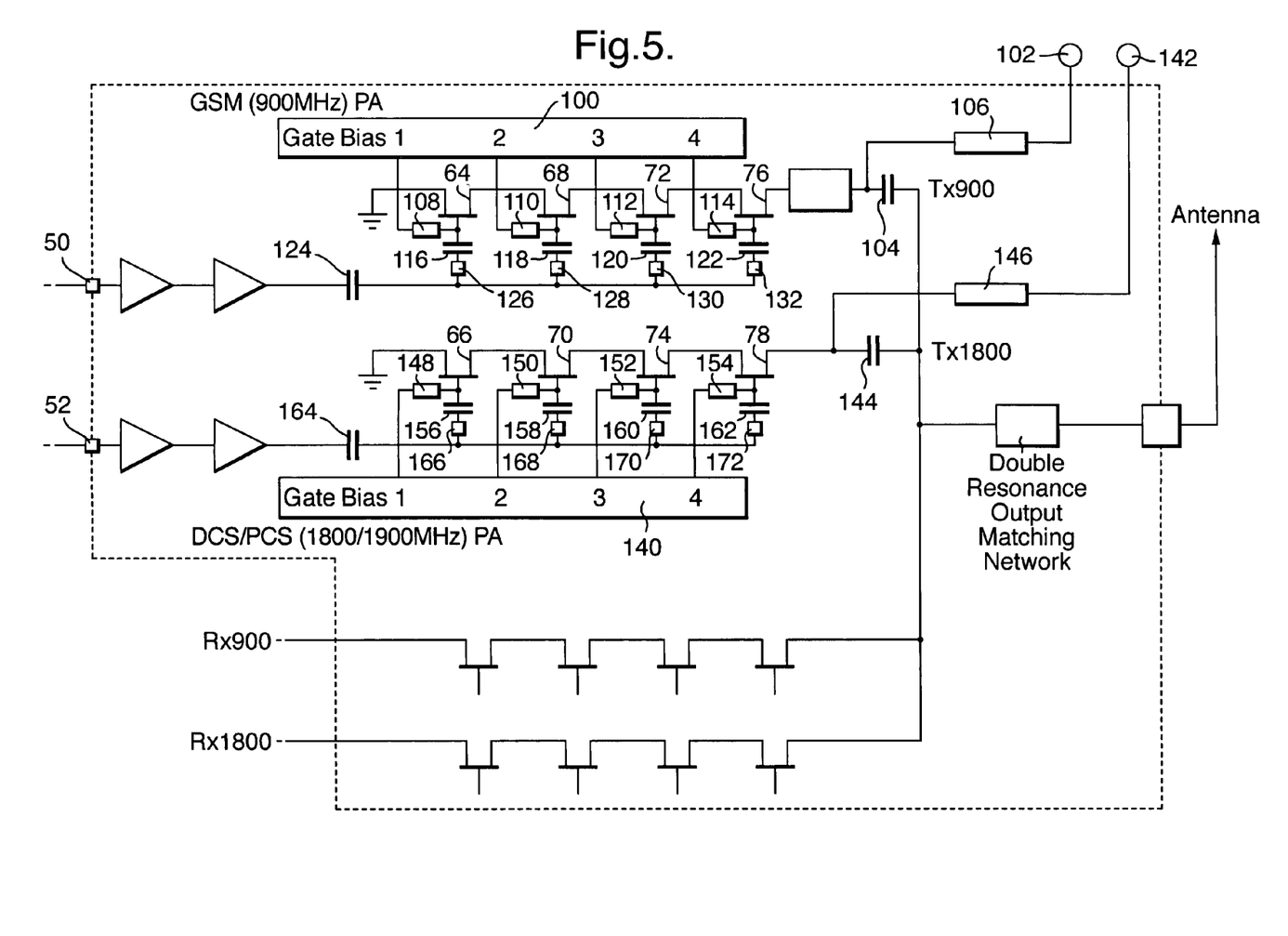
FIG. 5 illustrates schematically bias connections to the circuit of FIG. 3.

FIG. 5 illustrates the DC bias connections of the circuit of FIG. 3.

A gate DC bias circuit 100 is connected to the gates of transistors 64,68,72 and 76 and a DC bias connection 102 is provided to apply a DC drain/source bias to the source to drain conduction path of the transistors 64,68,72 and 76. In particular, when the transmission path from transmit connection 50 is turned on, a voltage of 12 volts is applied at the DC bias connection 102, thereby providing 12 volts over the conduction path through the source/drains of the transistors 64,68,72 and 76 to ground 80. As will become apparent from the description given below, since the transistors are also acting as amplifiers, they will draw some current.

A capacitor 104 is provided to isolate the DC bias connection 102 from other signal paths in the circuit. An inductor 106 acts as a high impedance to the RF signal but low impedance for the DC bias so as to prevent the RF signal affecting the power supply.

As will be appreciated, with the DC drain/source bias applied across all of the transistors 64,68,72,76 in series, the respective voltage across each of the transistors will be different. Hence, in order to bias the respective gates to bring the transistors into an amplifying state, it is necessary to provide different respective gate voltages. Hence, the gate DC bias circuit 100 provides a gate voltage of 0 volts to transistor 64, 3 volts to transistor 68, 6 volts to transistor 72 and 9 volts to transistor 76.

Each gate is connected to the gate DC bias circuit 100 by means of a respective resistor 108,110,112 and 114. These resistors act as a high impedance to the RF signal but as a sufficiently low impedance to the DC gate bias. This is because the gate has a very high impedance for DC, but low impedance for RF.

Also, each gate is connected to the signal path, i.e. the output of amplifying stage 60, by means of a respective capacitor 116,118,120,122 for isolating the bias applied to each gate from the other gates.

Optionally, capacitor 124 may also be provided as a block to the DC voltages to the upstream power amplifier stages. This supplements the DC isolation provided by capacitors 116,118,120,122.

Finally, it is also possible to use additional small transistors 126,128,130 and 132, such as FETs, on each gate in order to improve the isolation between the transistors 64,68, 72 and 76. These small transistors are biassed to be on or off at the same time as the transistors 64,68,72 and 76.

In order to turn off the signal path from the connection 50, the DC bias connection is brought to 0 volts and the gate DC bias circuit 100 brings the gate voltage of all of the transistors 64,68,72 and 76 to −3.8 volts.

In this way, the transistors 64,68,72 and 76 of the signal path from the connection 50 may selectively be controlled between on and off states wherein, in the on state, they also act as an amplifying stage.

In the illustrated embodiment, the signal path from connection 52 is provided with a gate DC bias circuit 140, DC bias connection 142, capacitor 144, inductor 146, resistors 148 to 154, capacitors 156 to 162, capacitor 164 and, optionally, small transistors 166 to 172. As will be appreciated, these components operate in a manner directly equivalent to those discussed above, such that the signal path from connection 52 may also be turned on or off selectively.

It will be appreciated that, in order to operate this circuit, a supply voltage of 12 volts is required due to the fact that the final amplifier stage includes 4 transistors in series. This means that the operating voltage is 4 times that of a conventional 3 volt FET output stage. However, an appropriate DC-DC converter can easily be integrated as part of the power amplifier power control function.

Of course, it will be appreciated that the required DC bias voltages will differ accordingly if transistors of different characteristics are used or if less than or more than 4 transistors are provided in series. Similarly, with different materials for the devices, the applied polarities may be reversed.

Figure 6:
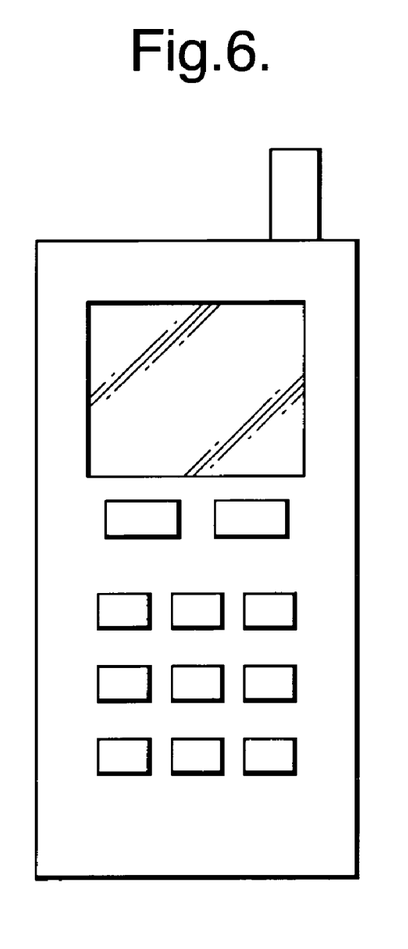
FIG. 6 illustrates a mobile telephone handset embodying the present invention.

The antenna switch arrangement may be used in a transceiver such as a mobile telephone as illustrated in FIG. 6.

I claim:

1. An antenna switch including:
   a transmit connection for inputting a radio frequency signal;
   an antenna connection for connection to an antenna for transmitting the radio frequency signal; and
   a signal path between the transmit connection and the antenna connection including a plurality of series connected transmit transistors, each transmit transistor having a gate, a drain and a source, the source of one transmit transistor being connected to the drain of a subsequent transmit transistor and the plurality of series connected transmit transistors being controllable to connect selectively the transmit connection to the antenna connection so as to transfer the radio frequency signal from the transmit connection to the antenna connection; wherein
   the transmit transistors arranged so as to provide a stage of amplification to the radio frequency signal; and
   the transmit connection is connected to the gate of each transmit transistor such that the radio frequency signal is transferred from the transmit connection to the gate of each transmit transistor.

2. An antenna switch according to claim 1 wherein a gate DC bias circuit is connected to the gate of each transmit transistor so as to enable the respective transmit transistor to be turned on or off according to a DC gate bias.

3. An antenna switch according to claim 1 wherein the source to drain conduction path of the transmit transistors is connected between a DC bias connection and ground such that the transmit transistors can be turned on or off according to a DC drain/source bias applied at the DC bias connection.

4. An antenna switch according to claim 1 wherein the signal path includes an inductor-capacitor resonant circuit between the transistors and the antenna connection so as to eliminate one or more frequencies.

5. An antenna switch according to claim 1 wherein a matching circuit is provided between the transmit transistor and the antenna connection to provide impedance matching.

6. An antenna switch according to claim 5 further including at least one additional transmit connection and respective signal path, the matching circuit providing impedance matching at at least two frequencies corresponding to the frequencies intended for the respective transmit connections and signal paths.

7. An antenna switch according to claim 1 wherein the signal path includes at least one amplification stage between the transmit connection and said transmit transistors.

8. An antenna switch according to claim 1 embodied as an MMIC.

9. A transceiver including the antenna switch of claim 1.

10. A mobile telephone unit including the antenna switch of claim 1.

11. A method of providing a radio frequency signal to an antenna including:
    amplifying the radio frequency signal;
    selectively connecting the radio frequency signal to the antenna with an antenna switch including a plurality of series connected transistors, each transistor having a gate, a drain and a source, the source of one transistor being connected to the drain of the next transistor; wherein
    the radio frequency signal is amplified by arranging the transistors of the antenna switch to provide amplification of the radio frequency signal; and
    transferring the radio frequency signal to the gate of each transistor.

12. An antenna switch including:
    a transmit connection for inputting a radio frequency signal;
    an antenna connection for connection to an antenna for transmitting the radio frequency signal;
    a signal path between transmit connection and the antenna connection including at least one transmit transistor controllable to connect selectively the transmit connection to the antenna connection so as to transfer the radio frequency signal from the transmit connection to the antenna connection; wherein
    the transmit transistor is arranged so as to provide a stage of amplification to the radio frequency signal; and
    the source to drain conduction path of the transmit transistor or transistors is connected between a DC bias connection and ground such that the transmit transistor or transistors can be turned on or off according to a DC drain/source bias applied at the DC bias connection.

13. An antenna switch including:
    a transmit connection for inputting a radio frequency signal;
    an antenna connection for connection to an antenna for transmitting the radio frequency signal; and
    a signal path between transmit connection and the antenna connection including a plurality of series connected transmit transistors controllable to connect selectively the transmit connection to the antenna connection so as to transfer the radio frequency signal from the transmit connection to the antenna connection; wherein
    the transmit transistors together being arranged so as to provide a stage of amplification to the radio frequency signal; and
    the source to drain conduction path of the transmit transistors is connected between a DC bias connection and ground such that the transmit transistors can be turned on or off according to a DC drain/source bias applied at the DC bias connection.

14. A method of providing a radio frequency signal to an antenna including:

amplifying the radio frequency signal;

selectively connecting the radio frequency signal to the antenna with an antenna switch including at least one transistor wherein the radio frequency signal is amplified by arranging the at least one transistor of the antenna switch to provide amplification of the radio frequency signal; and connecting a source to drain conduction path of the transistor or transistors between a DC bias connection and ground such that the transistor or transistors can be turned on or off according to a DC drain/source bias applied at the DC bias connection.

15. A method of providing a radio frequency signal to an antenna including:

amplifying the radio frequency signal;

selectively connecting the radio frequency signal to the antenna with an antenna switch including a plurality of series connected transistors wherein the radio frequency signal is amplified by arranging the transistors of the antenna switch to provide amplification of the radio frequency signal; and connecting a source to drain conduction path of the transistors between a DC bias connection and ground such that the transistors can be turned on or off according to a DC drain/source bias applied at the DC bias connection.

* * * * *